(12) United States Patent
Yamazaki et al.

(10) Patent No.: US 7,887,614 B2
(45) Date of Patent: Feb. 15, 2011

(54) AIR SHOWER DEVICE, BUILDING, AND SYSTEM FOR REDUCING HAY FEVER

(75) Inventors: Shunpei Yamazaki, Setagaya (JP); Osamu Nakamura, Tochigi (JP); Yasuyuki Arai, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 282 days.

(21) Appl. No.: 12/000,827

(22) Filed: Dec. 18, 2007

(65) Prior Publication Data

US 2008/0156195 A1 Jul. 3, 2008

(30) Foreign Application Priority Data

Dec. 28, 2006 (JP) .............................. 2006-354365

(51) Int. Cl.
*A61L 9/01* (2006.01)
*F24F 7/00* (2006.01)

(52) U.S. Cl. ..................... 55/385.2; 55/472; 55/473; 55/DIG. 34; 96/422; 96/424; 96/397; 96/417; 96/421; 454/187

(58) Field of Classification Search ................ 55/385.2, 55/472, 473, DIG. 34; 96/422, 424, 397, 96/417, 421; 454/187
See application file for complete search history.

(56) References Cited

U.S. PATENT DOCUMENTS 6,660,070 B2 * 12/2003 Chung et al. .................. 96/424
6,723,159 B2 * 4/2004 Cheng ......................... 96/421
7,044,397 B2 * 5/2006 Bartlett et al. ............. 236/49.3
7,153,347 B2 * 12/2006 Kang et al. .................... 96/422
7,155,507 B2 12/2006 Hirano et al.

FOREIGN PATENT DOCUMENTS

DE    202005010585    12/2006

(Continued)

OTHER PUBLICATIONS

Chinese Office Action (Application No. 200710300498.3) Dated Sep. 3, 2010.

(Continued)

*Primary Examiner*—Duane Smith
*Assistant Examiner*—Minh-Chau T Pham
(74) *Attorney, Agent, or Firm*—Eric J. Robinson; Robinson Intellectual Property Law Office, P.C.

(57) ABSTRACT

An air shower device which prevents allergenic substances which cause hay fever from being brought into a living space, in which a person resides or carries out an activity, by an outside body. The air shower device includes a suction unit, which takes in outside air; an air blower unit having an air blower which blows air which has been taken in, at a specific air-flow rate and a filter which cleans by removing dust, including pollen, from air which is blown; and a dust collecting unit which collects dust, including pollen, from exhaust of an air shower room which includes the air blower unit. Further, the air shower device includes an air-flow rate control unit which controls the amount of air blown by an air blower according to an amount of pollen dispersed in the outside air.

17 Claims, 8 Drawing Sheets

FOREIGN PATENT DOCUMENTS

| | | |
|---|---|---|
| JP | 04-058953 | 2/1992 |
| JP | 11-166754 | 6/1999 |
| JP | 2002-059097 A | 2/2002 |
| JP | 2005-075579 | 3/2005 |
| JP | 2006-194468 | 7/2006 |

OTHER PUBLICATIONS

Chinese Office Action (Application No. 200710300498.3) mailed Sep. 3, 2010.

* cited by examiner

FIG. 5A
FIG. 5B
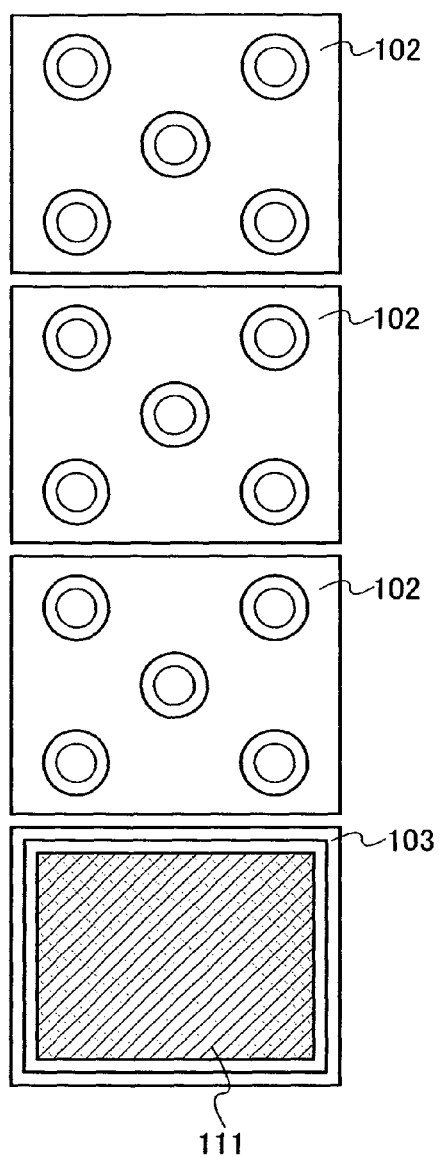
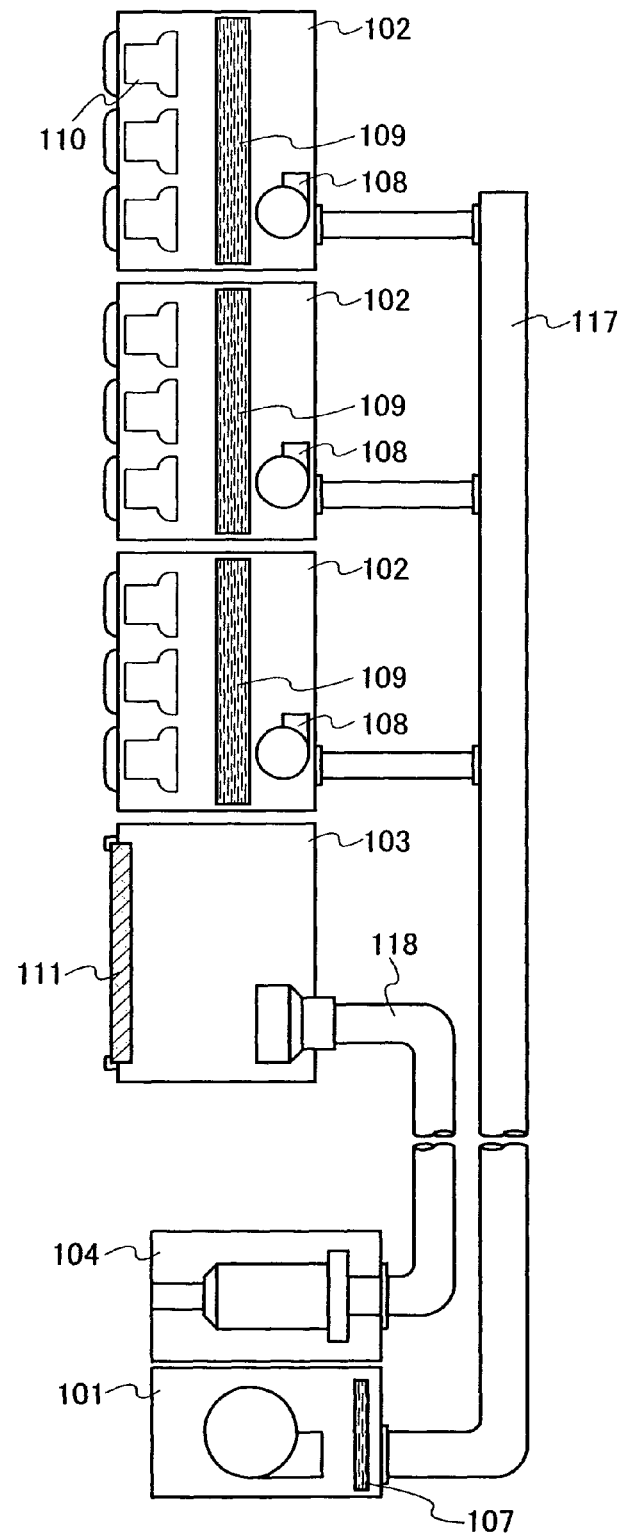

AIR SHOWER DEVICE, BUILDING, AND SYSTEM FOR REDUCING HAY FEVER

BACKGROUND OF THE INVENTION

1. Field of the Invention

The present invention relates to an air shower device, a building which includes an air shower device, a system for reducing hay fever, and a method of providing a system for reducing hay fever. The invention relates to equipment, buildings, systems, and services for removing allergenic substances which may adversely affect humans in living spaces and indoor spaces.

2. Description of the Related Art

Various dusts which cannot be seen by human eyes are dispersed in the atmosphere, and the effect which these dusts sometimes have on the human body is viewed as a problem. For example, while the effect of cedar pollen which disperses in the atmosphere in early spring may not lead to a serious illness, the cedar pollen has a large effect on human health, and nowadays this is a social problem.

Because pollen which disperses in the atmosphere adheres to peoples' clothes and the like and is brought into buildings, a measure whereby an air shower device, referred to as an air shower, is installed at the entrance of a building has been examined. For example, a hay fever protection system in which an air-blowing means, an air exhaust means, and a pollen collecting means are provided in a restricted space which must be passed through on entering a living space has been disclosed (see Patent Document 1: Japanese Published Patent Application No. H4-58953). Further, an allergen-free building in which an air shower device is provided at an entrance has been disclosed (see Patent Document 2: Japanese Published Patent Application No. 2006-194468). Nowadays, a hay fever-combating apartment building provided with a total system for improving air, which prevents pollen attached to clothes and the like and pollen from a fresh-air intake from penetrating, is on the market.

SUMMARY OF THE INVENTION

However, the measure of installing an air shower at an entrance of a building has problems such as the fact that maintenance of equipment is difficult, and when the scale is increased, operational costs also increase. Pollen dispersal and the like are greatly influenced by the seasons, so there is no advantage in operating an air shower device all year round. Further, even in pollen dispersal season, the effect of pollen dispersal and the like varies from day to day according to the weather and wind direction.

In view of the above, an object of the present invention is to keep an indoor space clean by removing adhered dust, such as pollen and the like, which adhered to a human before the human entered a building. Further, an object of the invention is to economically provide a service for removing allergenic substances such as pollen and the like.

A feature of the invention is an air shower device which prevents allergenic substances which cause hay fever from being brought into a living space, in which a person resides or carries out an activity, by an outside body. The air shower device includes a suction unit, which takes in outside air; an air blower unit having an air blower which blows air which has been taken in, at a specific air-flow rate and a filter which cleans by removing dust, including pollen, from air which is blown; a dust collecting unit which collects dust, including pollen, from exhaust of an air shower room which includes the air blower unit; and an air-flow rate control unit which controls the amount of air blown by the air blower in accordance with the amount of pollen dispersed in the outside air. Note that an 'outside body' refers to not just a human, but also an article which is brought into a living space in which a person resides or carries out an activity, and an animal such as a pet or the like.

Another feature of the invention is a building provided with an air shower device which prevents allergenic substances which cause hay fever from being brought into a living space, in which a person resides or carries out an activity, by an outside body. The air shower device includes a suction unit, an air blower unit, an exhaust unit, and a dust collecting unit, which can be assembled and disassembled. The air shower device is installed, in such a manner that it can be removed, at an entrance through which an outside body must inevitably pass when the outside body enters a living space. Preferably, the air shower device is installed at the entrance of the building for the duration of a plurality of months, from February to April. Of course, the season is not limited to being spring. The air shower device may be installed for the duration of fall, from October to December.

Another feature of the invention is a hay fever reducing system which prevents allergenic substances which cause hay fever from being brought into a living space, in which a person resides or carries out an activity, by an outside body. The hay fever reducing system includes an air shower device, which includes an air blower unit and an exhaust unit which can be assembled and disassembled; and an administrative server, which obtains information on pollen dispersal and issues an instruction to install the air shower device and an instruction to remove the air shower device. The air shower device is installed at an entrance through which an outside body must inevitably pass when the outside body enters a living space.

Another feature of the invention is a method of providing a hay fever reducing system, which includes a step of providing information on a pollen dispersal season to a client; a step of installing an air shower device at an entrance of a living space designated by the client, in response to a request by the client; a step of notifying the client that the pollen dispersal season has finished; and a step of removing the air shower device, in response to a request by the client.

According to the invention, a living space in which a person resides or carries out an activity can be kept clean by removing adhered dust, such as pollen and the like, which has adhered to an outside body. Further, by providing information on pollen dispersal seasons of outside air to a client, and setting operating conditions of an air shower device in a hay fever reducing system in accordance with the amount of pollen which is dispersed in the outside air, power consumption of the system can be reduced, and the system can be used economically.

BRIEF DESCRIPTION OF THE DRAWINGS

FIGS. 5A and 5B show a structure of an air shower device which can be assembled and disassembled.

DETAILED DESCRIPTION OF THE INVENTION

Figure 1:
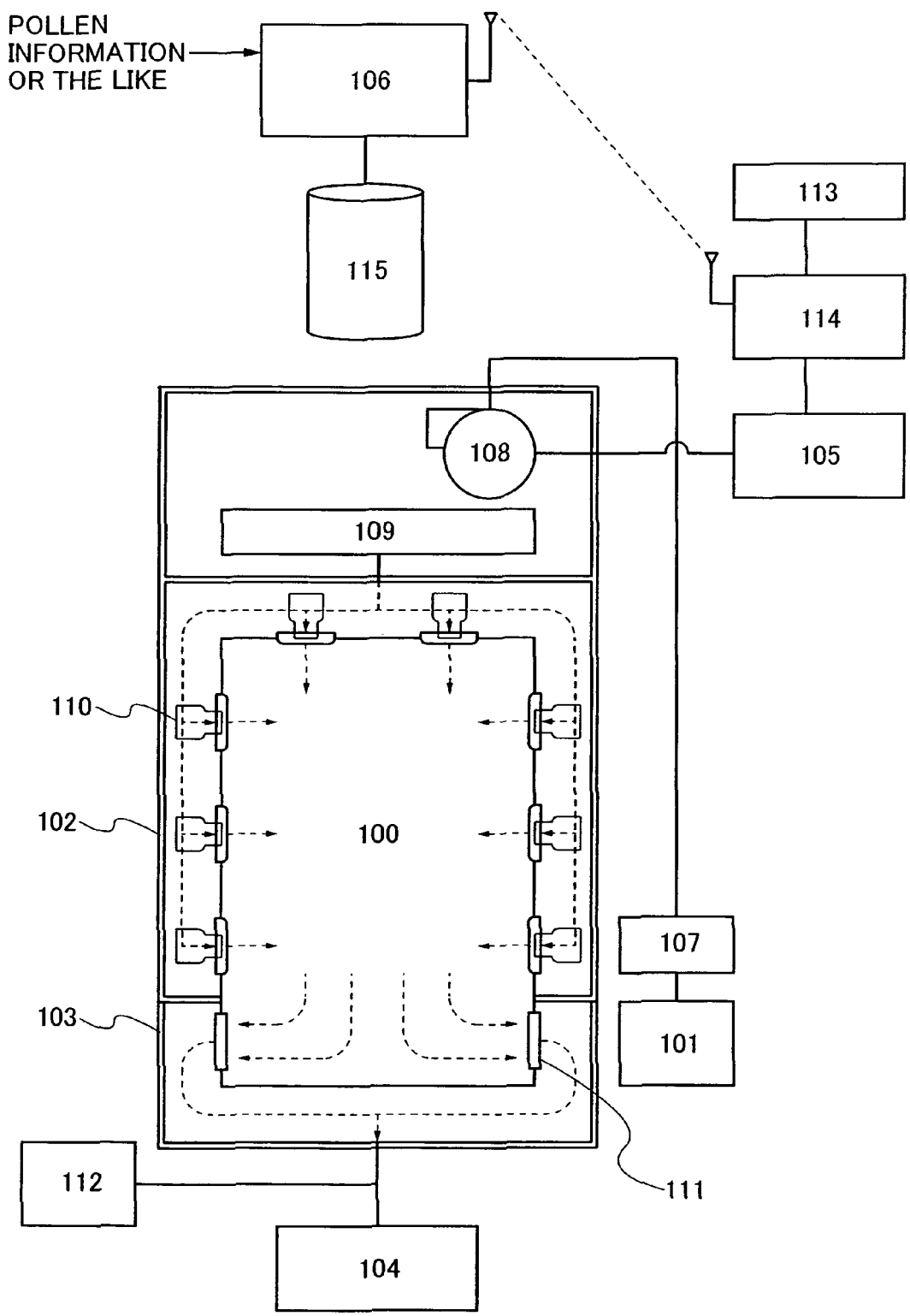
FIG. 1 shows an outline of an air shower device.

Hereinafter, an embodiment mode of the invention will be described with reference to the accompanying drawings. However, the invention can be carried out in many different modes, and those skilled in the art will readily appreciate that a variety of modifications can be made to the mode and its details without departing from the spirit and scope of the invention. Accordingly, the invention should not be construed as being limited to the description of the embodiment mode below. Note that in the drawings, like reference numerals are given to like parts or parts with like functions, and repetitive explanation of such parts is omitted.

An air shower device relating to the invention includes a suction unit, which takes in outside air; an air blower unit, which includes an air blower which blows air which has been taken in, at a specific air-flow rate, a filter which cleans air which has been blown by removing dust, including pollen, from the air which has been blown, and a shower nozzle which blows the cleaned air at an outside body; and a dust collecting unit which collects dust, including pollen, from exhaust of an air shower room. An air-flow rate control unit which controls the amount of air blown by the air blower in accordance with the amount of pollen dispersed in the outside air may also be included in this structure.

FIG. 1 shows an outline of an air shower device which relates to this embodiment mode. An airtight space which is cut off from outside air is formed by an air shower room 100. The air shower room 100 includes an air blower unit 102 and an exhaust unit 103. Although not illustrated, people from outside (e.g., users) go in and out of the air shower room 100 via a door which opens and shuts, and an airtight state is maintained during operation of an air shower. The air blower unit 102 is provided with a shower nozzle 110, and cleaned air is supplied to the shower nozzle 110. The cleaned air is blown from the shower nozzle 110 at an outside body in the air shower room 100 at a specific air velocity. Thereby, dust such as pollen and the like which has adhered to the outside body is removed. Besides a human, an outside body may be an article which is brought into a living space in which a person resides or carries out an activity, or an animal, such as a pet, or the like.

By an operation of the air blower 108, the shower nozzle 110 of the air blower unit 102 sends air, which is controlled such that it is sent at a specific air-flow rate, to the air shower room 100. The air is air which has been taken in by a unit 101 for taking in outside air which includes a duct provided with mesh or the like. Dust such as pollen and the like is removed from the air by a filter 109, and thus the air is cleaned. The filter 109 is selected according to the size of dust particles in the atmosphere which are desired to be removed. For example, to remove pollen which disperses in the atmosphere during February to April, since the diameter of the pollen particles is 10 to 100 μm, the pollen particles can be effectively removed when a HEPA filter (a high efficiency particulate air filter) or a ULPA filter (an ultra low penetration air filter) is used.

These filters are regulated by industrial standards of each country and the like. For example, in Japan, it is stipulated that a HEPA filter is 'an air filter which at rated air-flow rate has a particle collection efficiency of 99.97% or more with respect to particles with a diameter of 0.3 μm and has an efficiency of an initial pressure drop of 245 Pa or less'; and a ULPA filter is 'an air filter which at rated air-flow rate has a particle collection efficiency of 99.9995% or more with respect to particles with a diameter of 0.15 μm and has an efficiency of an initial pressure drop of 245 Pa or less'. Of course, the invention is not limited to such standardized filters, and a different kind of filter can be applied, as long as it is a filter which can remove allergenic substances such as pollen and the like.

Air in the air shower room 100 is discharged by the exhaust unit 103. The exhaust unit 103 is provided with an exhaust filter 111 which traps relatively large dust particles floating in the air shower room 100. A large amount of dust particles such as pollen and the like is contained in the air discharged from the exhaust unit 103. Because it is undesirable to discharge air which contains a large amount of dust particles to the outside air as is, a dust collecting unit 104 may be provided to trap dust which is in the air exhausted from the air shower room 100.

It is effective to construct a hay fever reducing system by providing an air shower device such as that described above with a function of adjusting dust-removing ability according to the amount of dust particles such as pollen and the like which are contained in the atmosphere. For example, according to the amount of pollen dispersed in the atmosphere, an air-flow rate of the air blower 108 of the air shower device may be adjusted, or the amount of time for which air is blown may be adjusted. That is, on days when there is a large amount of pollen, the air-flow rate of the air blower 108 may be increased, or the amount of time for which air is blown may be increased. Meanwhile, on days when the amount of pollen is small, the air-flow rate of the air blower 108 may be decreased, or the amount of time for which air is blown may be shortened. By finely setting the dust-removing ability of the air shower device in this manner, power consumption can be reduced. Further, the burden for users of enduring strong wind in the air shower room 100 can be reduced.

As such a system for controlling the air-flow rate of the air shower room 100 according to the amount of pollen dispersed in the atmosphere, providing the air blower 108 with an air-flow rate control unit 105 as appropriate is a preferable mode. The air-flow rate control unit 105 obtains information on the amount of pollen and controls the air-flow rate. As information about the amount of pollen, values detected by an outside air pollen sensor 113 which is provided in a place where an air shower device is installed and information on pollen which is provided by a weather information provider can be used.

As shown in FIG. 1, the amount of pollen in the air exhausted from the air shower room 100 may be detected by a pollen sensor 112 and this information may be fed back to the air-flow rate control unit 105. In the case where the air shower device is used in the kind of place where a large number of unspecified users from a wide area gather, the amount of pollen which has adhered to the users will vary depending on the environment of the route by which they traveled. In such cases, pollen and the like which has adhered to the users can be effectively removed by detecting the amount of pollen in the air exhausted from the air shower room 100, outputting that information to the air-flow rate control unit 105, and using it for controlling the air-flow rate.

A hay fever reducing system relating to the invention includes an air shower device which includes an air blower unit and an exhaust unit which can be assembled and disassembled, and an administrative server which obtains pollen dispersal information and issues an instruction to install the air shower device and an instruction to remove the air shower device. The administrative server may have a function of determining an optimum operating condition for the air shower device by comparing information on pollen dispersal concerning a wide region with local pollen dispersal information. Further, the air shower device is installed at an entrance which an outside body must inevitably pass through when entering a living space.

Figure 2A:
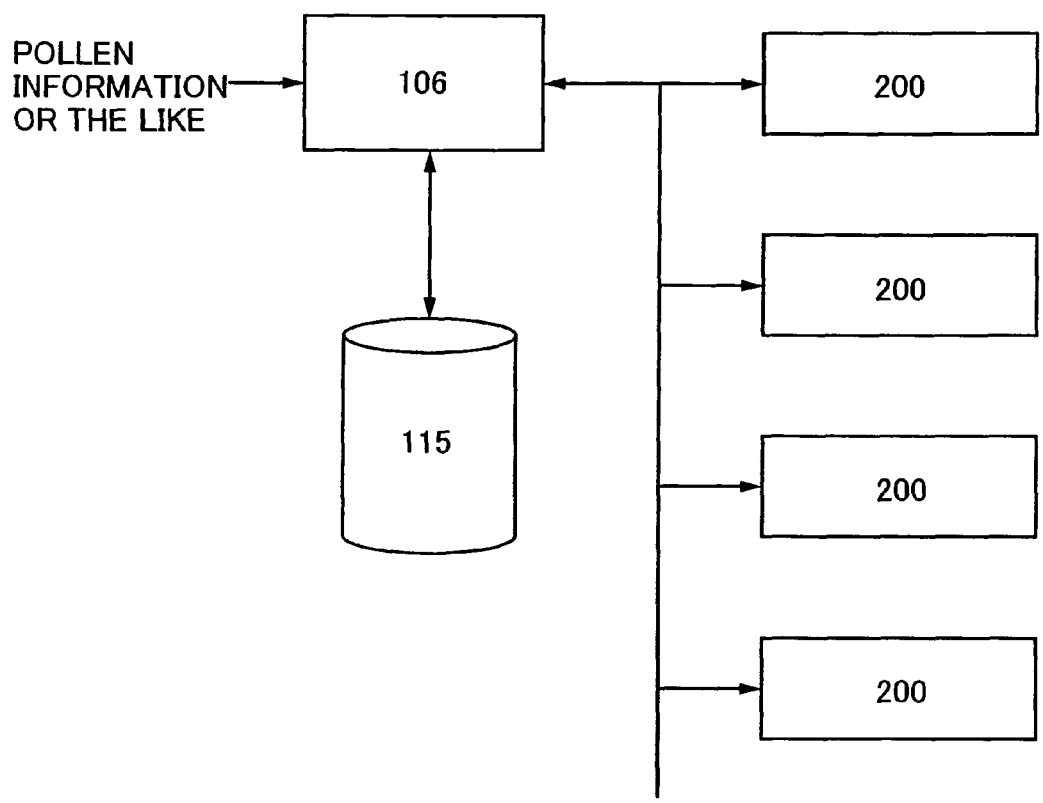
FIGS. 2A and 2B are block diagrams showing a structure of a hay fever reducing system.
Figure 2B:
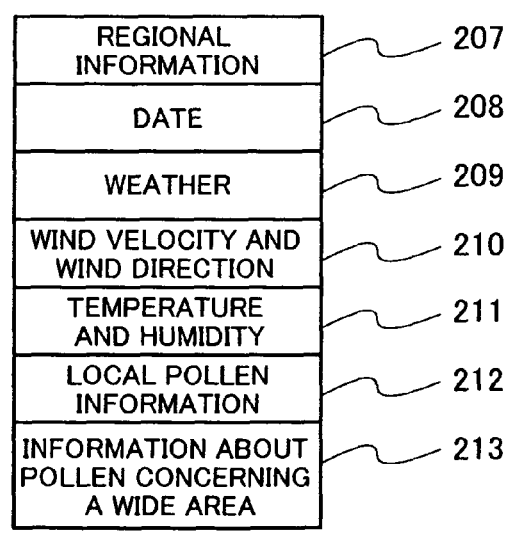

A structure of such a hay fever reducing system is shown in FIG. 2A. An administrative server 106 is connected to an air shower device 200 via a communication network, and the administrative server 106 and the air shower device 200 can transmit and receive signals to and from each other. The administrative server 106 includes a recording medium 115 which records pollen information provided by a weather information provider and pollen information which is transmitted from the air shower device 200. Information recorded in the recording medium 115 is, for example, regional information 207 about a region where an air shower device is installed; a date 208 of when data was recorded; weather 209; wind velocity and wind direction 210; temperature and humidity 211; local pollen information 212 (a detected amount of pollen); information about pollen concerning a wide area 213 (pollen information provided by a weather information provider); and the like, as shown in FIG. 2B.

The administrative server 106 receives pollen information provided by a weather information provider and transmits information concerning a place where an air shower device is installed to a communication device 114. A computer which includes a data processing program and a microprocessor can be used instead of the air-flow rate control unit 105. When the air-flow rate control unit 105 collates values detected by the outside air pollen sensor 113 and pollen information transmitted from the administrative server 106 and sets an appropriate air-flow rate, more precise control can be performed.

Further, in the administrative server 106, a database may be constructed by recording pollen information provided by a weather information provider and values detected by the outside air pollen sensor 113 in the recording medium 115. By accumulating pollen dispersal information and on-site data about the amount of pollen over a plurality of years, unique pollen dispersal information can be created, and a unique service can be provided to a user of the air shower device.

Preferably, such an air shower device, or hay fever reducing system in which an air shower device is provided with an air-flow rate control unit, is provided and used in a place which is unavoidable which is an entrance of a building through which people go in and out. However, in the case where an aim is to remove pollen, because pollen dispersal and the like are greatly influenced by the seasons, there is not much advantage in operating a dust removing device all year round. Therefore, the air shower device, or hay fever reducing system in which an air shower device is provided with an air-flow rate control unit, is preferably movable or able to be assembled and disassembled easily.

In a building provided with an air shower device relating to the invention, allergenic substances which cause hay fever can be prevented from being brought into a living space, in which a person resides or carries out an activity, by an outside body. The air shower device includes a suction unit, which takes in outside air; an air blower unit, which includes an air blower which blows air which has been taken in, at a specific air-flow rate, a filter which cleans air which has been blown by removing dust, including pollen, from the air which has been blown, and a shower nozzle which blows the cleaned air at an outside body; an exhaust unit through which a current of air from the air blower unit flows, which includes an inlet for the current of air which is provided with an exhaust filter; and a dust-collecting unit, which collects dust, including pollen, from exhaust of the exhaust unit. The air shower device is formed such that the suction unit, the air blower unit, the exhaust unit, and the dust-collecting unit can be assembled and disassembled. The air shower device is installed, in a manner such that it is removable, at an entrance of a building which is an entrance through which an outside body must inevitably pass when entering a living space. The air shower device may be installed for the duration of a plurality of months which is a season during which pollen disperses; for example, from February to April. Of course, the season is not limited to being spring. Pollen which disperses during fall, for example, during October to December, may be targeted.

Figure 3A:
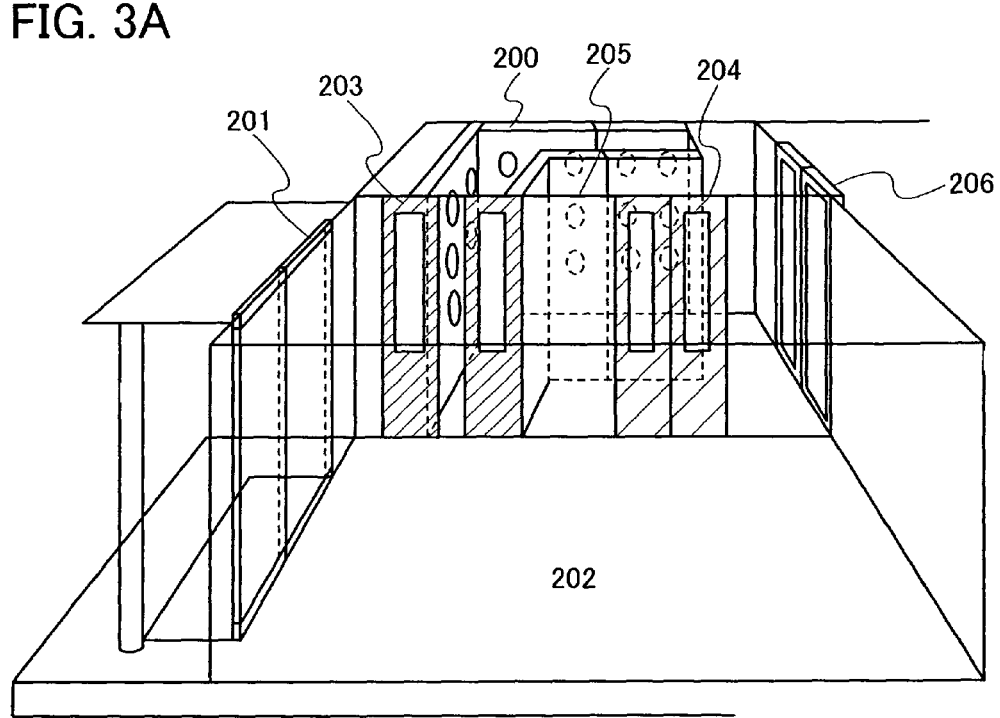
FIGS. 3A and 3B show an example in which an air shower device is set up at an entrance of a building.

FIG. 3A shows an example in which an air shower device is installed at an entrance of a building, such as an apartment building, a hotel, or an office building. The air shower device 200 is provided in an entrance hall 202 which is between an outside door 201 and an inside door 206. It is desirable that the air shower device 200 be installed taking a line of flow of users into consideration, so that users can use the air shower device 200 in a natural manner. However, if a person who has passed through the air shower device 200 and a person who has not passed through the air shower device 200 freely go through the inside door 206, a dust-removing effect will be reduced. Therefore, it is preferable to make the line of flow of users one-way by providing a partition wall 205 with an entrance 203 and an exit 204. Users who have passed through the entrance 203 are compelled to pass through the air shower device 200. Meanwhile, since it is not necessary for a person who exits the building to pass through the air shower device 200, they may be guided to the exit 204 so that they can immediately go out into the entrance hall 202.

Figure 3B:
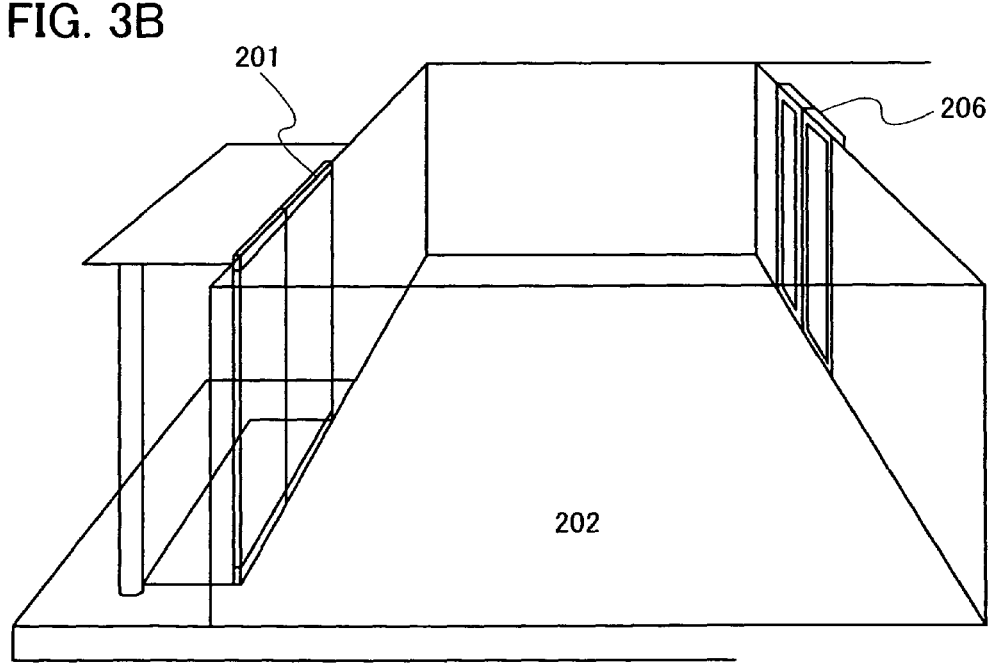

FIG. 3B shows a view of when the air shower device 200 has been removed. People entering and exiting the building can freely go through the entrance hall 202 between the outside door 201 and the inside door 206. Such a situation is maintained in, for example, summer, when the amount of pollen is small. A public space can be used effectively when the air shower device 200 is formed such that it is movable or able to be assembled and disassembled in this manner.

Figure 4:
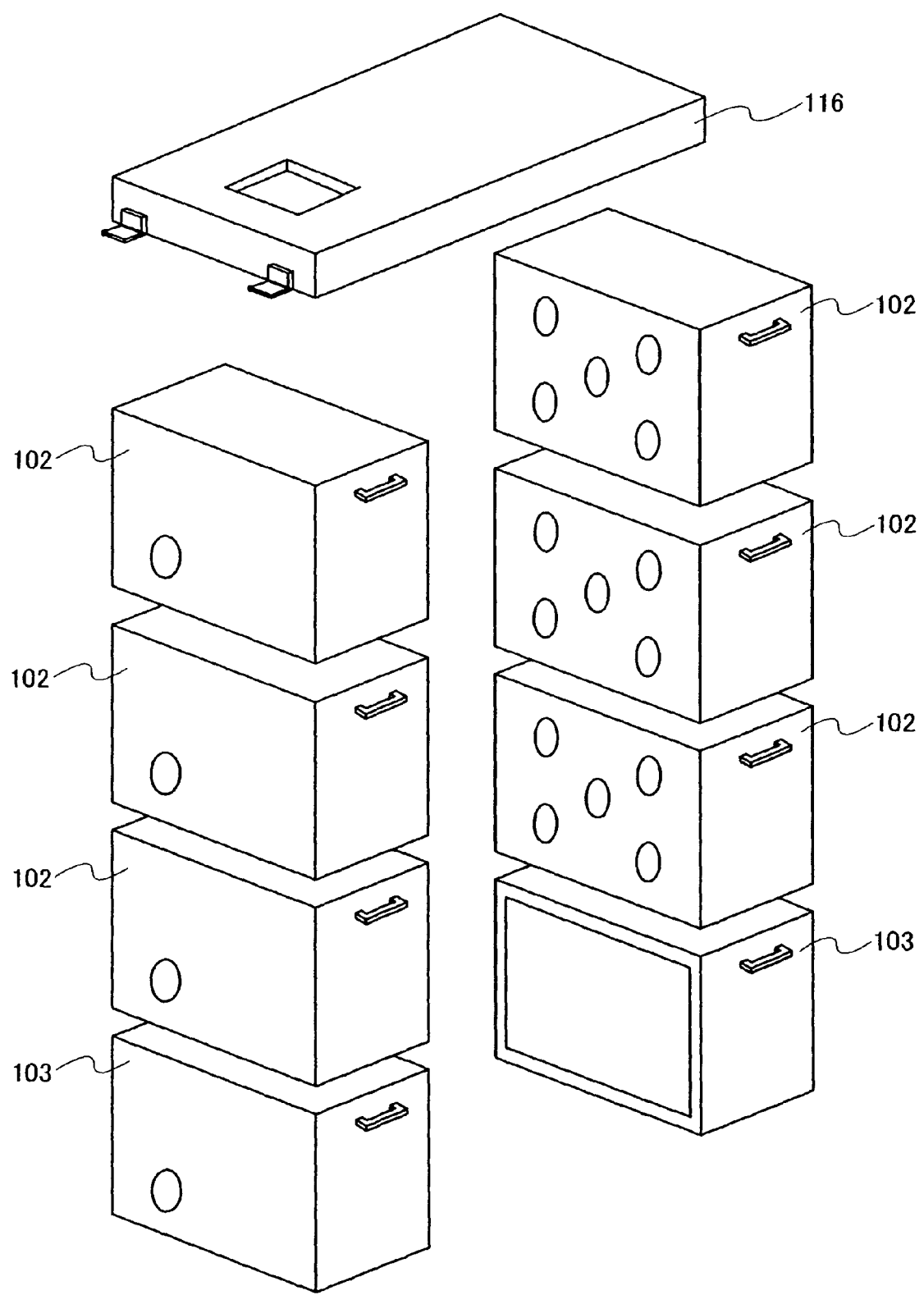
FIG. 4 shows main components of an air shower device which can be assembled and disassembled.

FIG. 4 shows main components of an air shower device which can be assembled and disassembled. The air shower device can be split up into the air blower unit 102, the exhaust unit 103, and a top panel unit 116, and carried. In the structure of the air shower device, the exhaust unit 103 is installed on a lowest level and the air blower unit 102 is fixed over that. A plurality of air blower units 102 can be stacked. The number of air blower units 102 that are stacked may be determined as appropriate taking a place where the air shower device is installed and a necessary air-flow rate into consideration.

The top panel unit 116 is installed on a highest level and also has a function of fixing the air blower unit 102 and the exhaust unit 103 of lower levels. The exhaust units 103 and the air blower units 102 may be disposed on both sides of a passageway such that the exhaust units 103 and the air blower units 102 on one side of the passageway face those on the other side of the passageway; or they may be disposed on only one side of the passageway. In FIG. 4, a combination including the exhaust units 103, the air blower units 102, and the top panel unit 116 is shown. A plurality of these combinations can be arranged along a path of movement of people entering. The number of levels which are disposed in a path of movement in the passageway can be freely changed to suit conditions of the place where the air shower device is installed.

FIG. 5 shows a structure of an air shower device which can be assembled and disassembled. FIG. 5A is a front view of the air shower device, which can be assembled and disassembled, and FIG. 5B is a side view of the air shower device, which can be assembled and disassembled, showing a connection between a suction unit and an exhaust unit.

The air blower unit 102 includes the shower nozzle 110. The shower nozzle 110 is movable so that the direction of an outlet opening through which air is blown out can be changed within a certain range. The air blower 108 and the filter 109, which is provided in the pathway of air blown from the air blower 108, are provided in the air blower unit 102. The air blower units 102 are connected in parallel to the unit 101 for taking in outside air by an air blower duct 117. The suction unit 101 introduces outside air via a pre-filter 107. The amount of air blown by the suction unit 101 is determined taking the number of air blower units 102 with which it is connected into consideration. The exhaust unit 103 is provided with the exhaust filter 111, and air which is exhausted from the exhaust unit 103 passes through an exhaust duct 118 and is collected in the dust collecting unit 104.

In the structure shown in FIG. 5, when the air blower units 102 are connected with the suction unit 101 by the air blower duct 117, there can be flexibility in determining how many air blower units 102 to install, and the degree of freedom of the installation location of the suction unit 101 can be increased. Further, when the exhaust unit 103 is connected with the dust collecting unit 104 by the exhaust duct 118, the installation location of the exhaust duct 118 can also be freely determined.

Figure 6A:
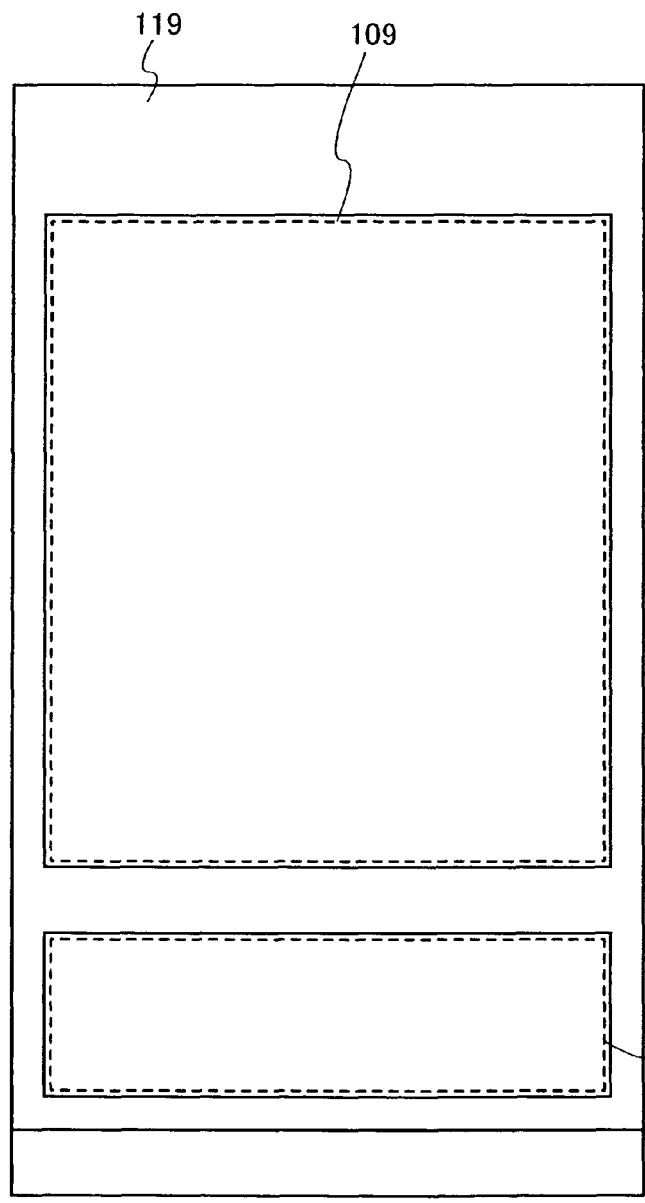
FIGS. 6A and 6B show an example of a movable dust removing unit.
Figure 6B:
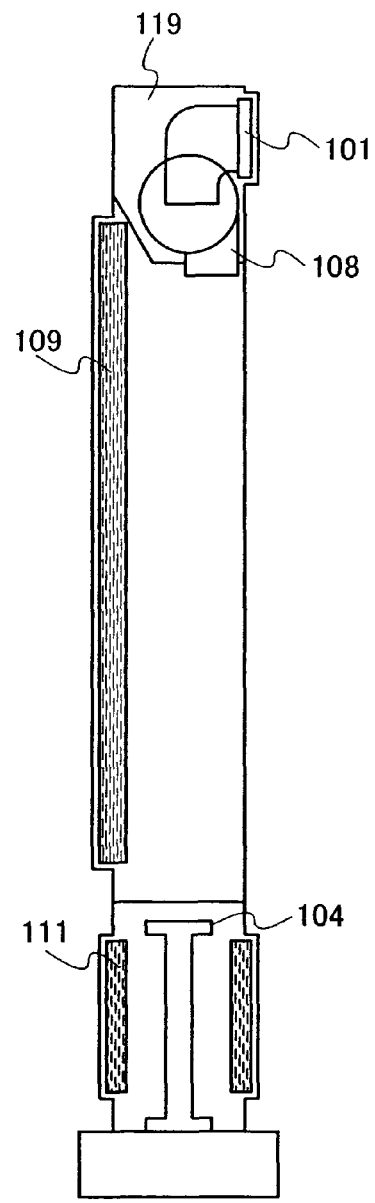

FIGS. 6A and 6B show an example of a movable dust removing unit. The dust removing unit has the outside appearance of a partition wall. FIG. 6A is a front view of the removable dust removing unit and FIG. 6B is a side view of the removable dust removing unit.

In the removable dust removing unit, the suction unit 101, the air blower 108, the filter 109, the exhaust filter 111, and the dust collecting unit 104 are integrated in a cabinet 119. An inner part of the cabinet 119 is divided into an air blowing side and an exhaust side. In order to obtain an air-flow rate and an air blowing area, the volume of the air blowing side is made large. Looking at the dust removing unit front on, a large area of the filter 109 is exposed. Clean air is blown from the filter 109.

An air shower device can be formed by combining a plurality of such movable dust removing units and installing them in an entrance hall of a building, as shown in FIG. 3. When seen from the side, the dust removing unit has the appearance of a thin wall, like a partition wall. Therefore, transporting the dust removing unit is easy, and it can be easily installed even in a place where a passageway is narrow and small.

Figure 7:
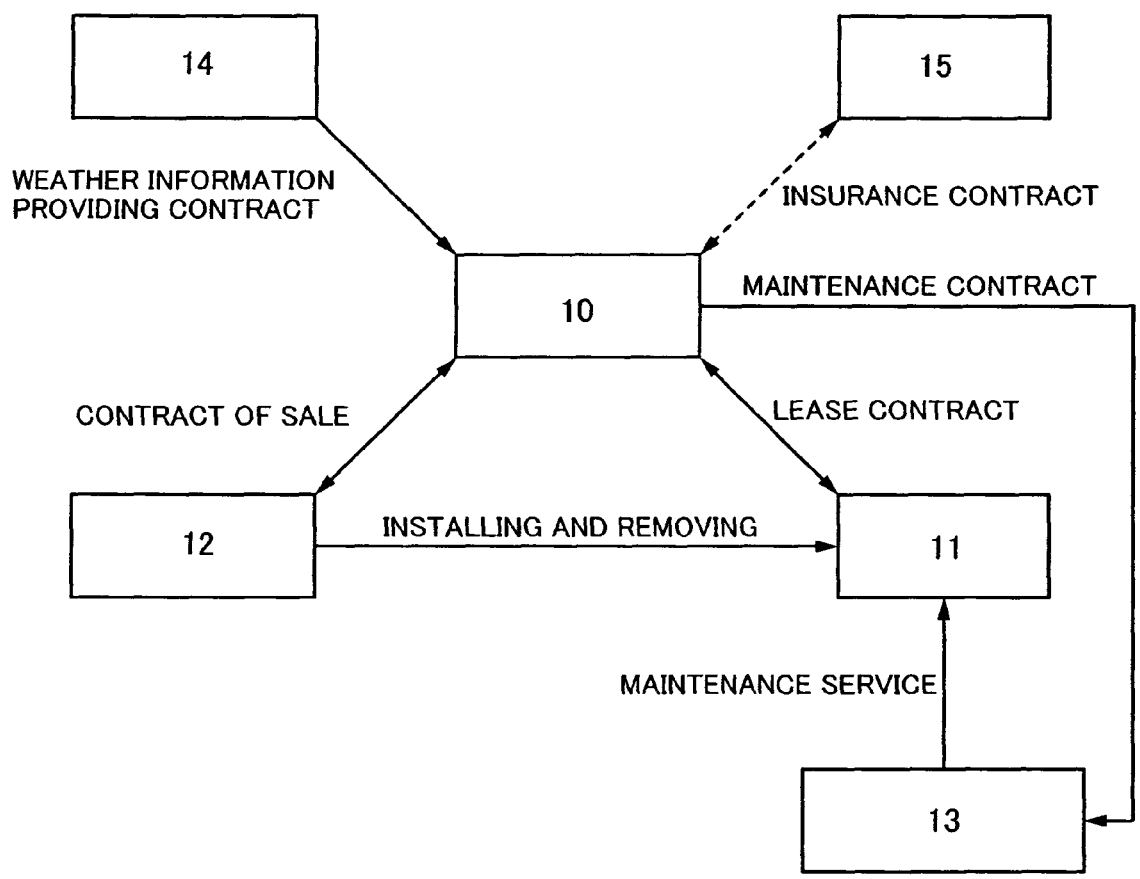
FIG. 7 is a block diagram showing a mode of providing a service which uses an air shower device.

FIG. 7 shows a business mode relating to this embodiment mode. The business mode includes a lease contract between a dust removal service provider 10 (e.g., a lessor, a leasing company) and a client 11 (a lessee); a business contract (which may be a contract of sale) between the dust removal service provider 10 and a device management provider 12 (an equipment management provider); a maintenance contract between the dust removal service provider 10 and a maintenance provider 13; and a weather information providing contract between the dust removal service provider 10 and a weather information provider 14. Besides these contracts, there may be an insurance contract between the dust removal service provider 10 and a property insurance carrier 15. The dust removal service provider 10 may decide to enter into such a contract as they think fit.

The client 11 that is a target of the dust removal service provider 10 may be an intermediary for sale in lots of a residence such as an apartment building or an administrator of a residence such as an apartment building; an owner or an administrator of a building which contains a commercial facility, such as a retail business; an owner or an administrator of accommodation, such as a hotel, or a recreational facility, such as a movie theater or a theater; an owner or an administrator of a public facility, such as a station building or an airport building; or the like.

The dust removal service provider 10 enters into a weather information providing contract with the weather information provider 14 in advance. Weather information provided by the weather information provider 14 includes information concerning dispersal of pollen, such as cedar pollen, which may affect a human body, as well as general weather information. The dust removal service provider 10 uses this weather information to cultivate clients and to conduct promotional activities, advertising, and canvassing.

For example, the dust removal service provider 10 introduces a dust removing device which removes dust such as pollen and the like to the client 11, and conducts sales to encourage the client to install the dust removing device. Particularly before the advent of a season in which pollen disperses, the dust removal service provider 10 promotes the advantageous effects of the dust removing device by introducing the dust removing device through door-to-door sales, direct mail, the internet, and the like. A selling point which may be promoted is that when pollen can be effectively removed, a comfortable environment can be provided to hay fever sufferers. Further, an advantage which may be promoted is that when a season in which pollen disperses is over, the dust removing device is removed and a place where it was installed is returned to the state it was in before, so the device is not a hindrance, and maintenance of the facility is not an excessive burden.

When the client 11 is considering introducing the dust removing device, together with the dust removal service provider 10, the client decides on matters such as when to introduce the dust removing device; specifications of the dust removing device, based on an estimated number of users per day; color and design; installation location; price of a lease; and the like.

In the case where the client 11 wishes to introduce the dust removing device through a lease, the client 11 applies to the dust removal service provider 10 for a lease. When the dust removal service provider 10 decides to accept the lease application, conditions of a lease contract and the like are confirmed, and then the dust removal service provider 10 enters into the lease contract with the client 11.

Next, based on the lease contract which has been entered into, the dust removal service provider 10 enters into a business contract concerning a dust removing device desired by the client 11 with the device management provider 12.

Based on the business contract, the device management provider 12 sends the dust removing device directly to a place designated by the client 11 and installs the dust removing device. The lease of the object by the client 11 starts from a date of lease noted on an object lease certificate for the dust removing device, which is issued to the dust removal service provider 10 by the client 11. From the date of the start of the lease, the client 11 can use the object, and also has a duty of paying a lease charge to a leasing company. Meanwhile, according to the business contract, starting from the date of lease, the object is regarded as having been delivered to the dust removal service provider 10 by the device management provider 12, and the dust removal service provider 10 pays a charge proportionate to the period of usage of the object to the device management provider 12.

According to the above-mentioned contracts, generally the dust removal service provider 10 assumes duties of maintenance and repair of the dust removing device. The dust removal service provider 10 enters into a maintenance contract with the maintenance provider 13, and based on the maintenance contract, the client 11 receives provision of a maintenance service directly from the maintenance provider 13. The maintenance service includes exchanging a filter of the dust removing device, maintaining cleanliness, and the like.

Further, in addition to the above, the dust removing device can be insured by one or more of the above-mentioned contracts. This is so that unforeseen property damage accidents or physical injury accidents involving a dust removing device which is used by a large number of unspecified users which may occur can be handled. In this case, at the same time as the lease starts, the dust removal service provider 10 notifies the property insurance carrier 15, and the insurance contract goes into effect; and the dust removal service provider 10 pays an insurance premium to the property insurance carrier 15. Of course, the insurance contract is optional, and the dust removal service provider 10 may decide to enter into an insurance contract as they think fit.

Note that the invention is not limited to the structure in FIG. 7. The dust removal service provider, the device management provider, the maintenance provider, and the weather information provider do not have to be organized as separate legal entities. The invention can also be applied in cases where any of the functions of the above-mentioned plurality of enterprises are performed by one enterprise, such as a case where the dust removal service provider and the device management provider are the same enterprise, a case where the device provider and the maintenance provider are the same enterprise, or the like.

A mode of a service performed by a dust removal service provider such as the one above will now be described. A method of providing a hay fever reducing system relating to the invention includes a step of providing information on a pollen dispersal season to a client; a step of installing an air shower device at an entrance of a living space designated by the client, in response to a request by the client; a step of notifying the client that a pollen dispersal season is over; and a step of removing the air shower device in response to a request by the client. Further, an alternative mode of the service includes a step of providing information on a pollen dispersal season to a client; a step of installing an air shower device at an entrance of a living space designated by the client, in response to a request by the client; a step of obtaining information on pollen dispersal concerning a wide area from a weather information provider; a step of obtaining local pollen dispersal information from a pollen sensor provided at an air shower installation location; a step of determining an optimum operating condition for the air shower device by comparing information on pollen dispersal concerning a wide area with local pollen dispersal information; a step of providing the optimum operating condition for the air shower device to the client; a step of notifying the client that the pollen dispersal season is over; and a step of removing the air shower device in response to a request by the client.

Figure 8:
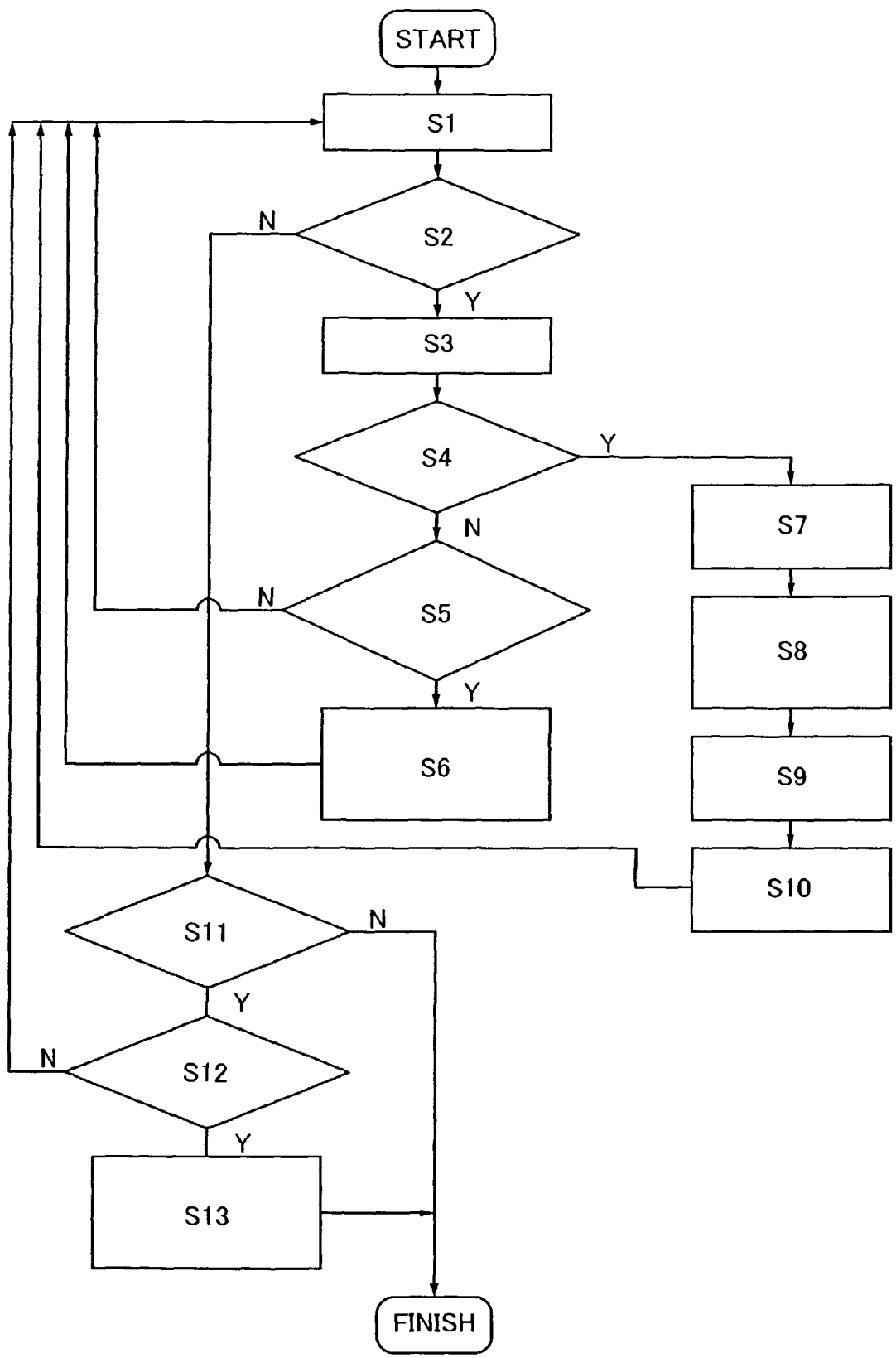
FIG. 8 is a flow chart showing a flow of a service which uses an air shower device, which is performed for a client.

FIG. 8 is a flow chart which shows an example of a service performed for a client using an air shower device. The flow chart shows a business process of a dust removal service provider.

The dust removal service provider obtains weather information from a weather information provider with which it has entered into a contract (S1). Then, it is determined whether or not the provided weather information includes information on pollen dispersal (S2). In the case where pollen information is included, the pollen information is provided to a client (S3). Next, it is determined whether or not an air shower device is being leased (S4). In the case where an air shower device is not being leased, an inquiry is made to the client as to whether or not the client wishes to lease an air shower device (S5). Then, in the case where a reply to the effect that the client wishes to lease an air shower device is obtained from the client, a device management provider is instructed to install an air shower device (S6). Then, the routine (S1) in which weather information is obtained from the weather information provider is returned to.

Further, in the routine (S4), for clients to whom an air shower device is already being leased, pollen information concerning places where the clients have the air shower devices installed is obtained (S7). Then, weather information obtained from a weather information provider and the pollen dispersal information obtained in the routine (S7) are collated, and pollen dispersal information for each air shower device installation location is analyzed (S8). Based on results of the analysis, operating conditions for air shower devices of specified clients are calculated, and set (S9). Then, the calculated operating conditions are transmitted to those clients (S10). Then, the routine (S1) in which weather information is obtained from the weather information provider is returned to.

In the case where it is determined whether or not the provided weather information includes information on pollen dispersal (S2), and it is determined that information on pollen dispersal is not included, it is determined whether or not an air shower device is being leased (S11). Then, in the case where an air shower device is being leased, influence of the seasons is taken into consideration (S12), and a decision as to whether the lease should be continued or the air shower device should be removed because a pollen dispersal season is over is made (S12). In a case where a decision that the air shower device should be removed is made, the client is informed of that decision and the device management provider is instructed to remove the air shower device.

A service which is suitable for a client can be provided by employing the above-described business process. That is, an indoor space can be kept clean by removing adhered dust such as pollen and the like which adhered to a human before the human entered a building; and further, a hay fever reducing system which can be used economically by reducing a burden involved in maintaining a facility can be provided.

This application is based on Japanese Patent Application Serial No. 2006-354365 filed on Dec. 28, 2006 with the Japanese Patent Office, the entire contents of which are hereby incorporated by reference.

What is claimed is:

1. An air shower device comprising:
  an air flow rate control unit for controlling a specific air flow rate in accordance with an amount of dust dispersed in outside air;
  a suction unit for taking in air;
  an air blower unit comprising an air blower for blowing the taken in air to a space through a plurality of shower nozzles at the specific air flow rate and a filter for removing dust from the taken in air;
  an exhaust unit for exhausting air from the space; and
  a dust collecting unit for collecting dust from the air which is exhausted,
  wherein the air flow rate control unit is connected to an administrative server via a communication network, and
  wherein the administrative server includes information provided by a weather information provider.

2. The air shower device according to claim 1, wherein the dust removed by the filter includes an allergenic substance.

3. The air shower device according to claim 1, wherein the dust removed by the filter includes pollen.

4. The air shower device according to claim 1, wherein the dust removed by the filter includes cedar pollen.

5. A building comprising:
an entrance of a living space;
an air shower device which is installed in the entrance, the air shower device including:
a suction unit for taking in air;
an air blower unit comprising an air blower for blowing the taken in air to a space through a plurality of shower nozzles at a specific air flow rate and a filter for removing dust from the taken in air;
an exhaust unit for exhausting air from the space; and
a dust collecting unit for collecting dust from the air which is exhausted,
wherein the air shower device is assembled using the suction unit, the air blower unit, the exhaust unit and the dust collecting unit,
wherein the air shower device is removable,
wherein the air shower device is connected to an administrative server via a communication network, and
wherein the administrative server includes information provided by a weather information provider.

6. The building according to claim 5, wherein the air shower device is installed in the entrance, and wherein an outside body inevitably passes through the entrance.

7. The building according to claim 5, wherein the dust removed by the filter includes an allergenic substance.

8. The building according to claim 5, wherein the dust removed by the filter includes pollen.

9. The building according to claim 5, wherein the dust removed by the filter includes cedar pollen.

10. A building comprising:
an entrance hall provided between an outside door and an inside door;
an air shower device which is installed in the entrance hall, the air shower device including:
a suction unit for taking in air;
an air blower unit comprising an air blower for blowing the taken in air to a space through a plurality of shower nozzles at a specific air flow rate and a filter for removing dust from the taken in air;
an exhaust unit for exhausting air from the space; and
a dust collecting unit for collecting dust from the air which is exhausted,
wherein the air shower device is assembled using the suction unit, the air blower unit, the exhaust unit and the dust collecting unit,
wherein the air shower device is removable,
wherein the air shower device is connected to an administrative server via a communication network, and
wherein the administrative server includes information provided by a weather information provider.

11. The building according to claim 10, wherein the air shower device is installed in the entrance hall, and wherein an outside body inevitably passes through the entrance hall.

12. The building according to claim 10, wherein the dust removed by the filter includes an allergenic substance.

13. The building according to claim 10, wherein the dust removed by the filter includes pollen.

14. The building according to claim 10, wherein the dust removed by the filter includes cedar pollen.

15. A system for reducing hay fever that prevents allergenic substances from being brought into a living space by an outside body, comprising:
an air shower device including an air blower unit and an exhaust unit; and
an administrative server for obtaining pollen dispersal information from a weather information provider and determining an optimum operating condition for the air shower device,
wherein the air shower device is installed in an entrance of the living space;
wherein the outside body inevitably passes through the entrance; and
wherein the administrative server controls a specific air flow rate in accordance with an amount of pollen dispersed in outside air.

16. The system for reducing hay fever that prevents allergenic substances from being brought into a living space by an outside body according to claim 15, wherein the pollen dispersal information includes local pollen information and information about pollen concerning a wide area.

17. A system for reducing hay fever that prevents allergenic substances from being brought into a living space by an outside body, comprising the steps of:
providing information on a pollen dispersal season to a client;
installing an air shower device in an entrance of a living space designated by the client in response to a request by the client;
obtaining information on pollen dispersal concerning a wide area from a weather information provider;
obtaining local pollen dispersal information from a pollen sensor provided in a place where the air shower device is installed;
determining an optimum operating condition for the air shower device by comparing the information on pollen dispersal concerning a wide area with the local pollen dispersal information;
providing the optimum operating condition for the air shower device to the client; and
removing the air shower device in response to a request by the client.

* * * * *